Sept. 30, 1941.  G. J. ARENTSEN  2,257,410
PROCESS AND APPARATUS FOR CONTINUOUSLY MANUFACTURING
ARMORED CONSTRUCTION BOARDS
Filed Jan. 27, 1939
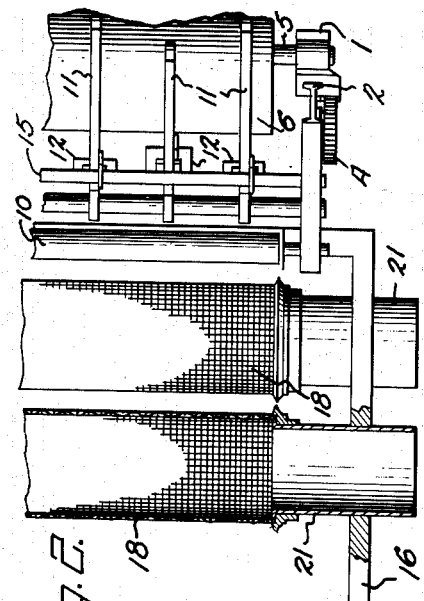
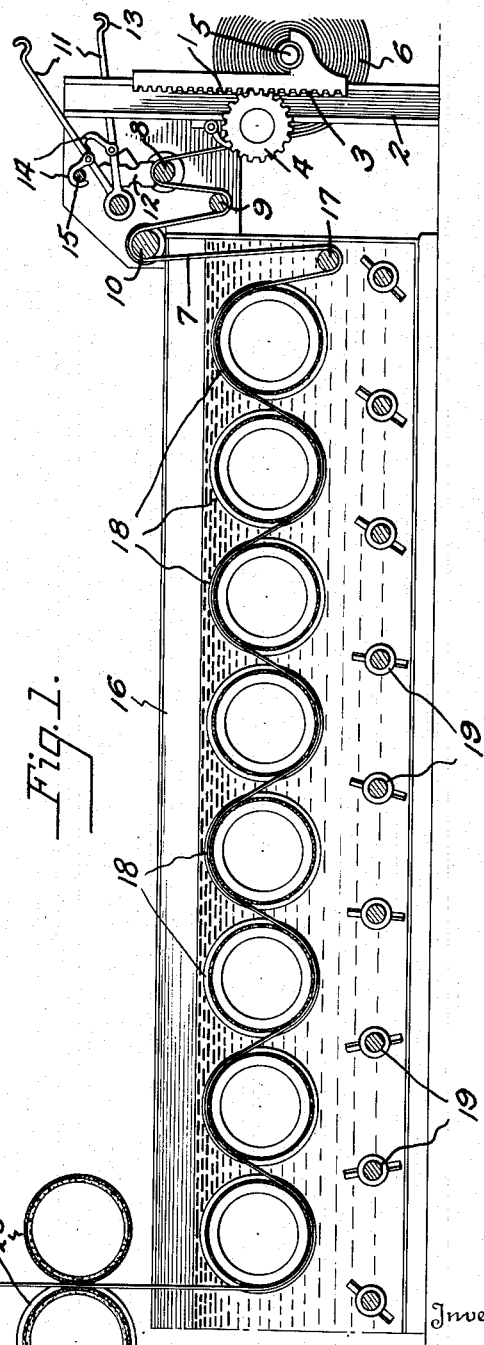
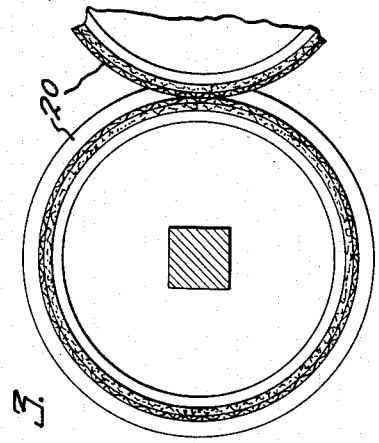
Inventor
Gerrit Jan Arentsen
By Stevens and Davis
Attorneys Patented Sept. 30, 1941

2,257,410

UNITED STATES PATENT OFFICE 2,257,410

PROCESS AND APPARATUS FOR CONTINUOUSLY MANUFACTURING ARMORED CONSTRUCTION BOARDS

Gerrit Jan Arentsen, Diemerbrug, near Amsterdam, Netherlands

Application January 27, 1939, Serial No. 253,231
In the Netherlands January 27, 1938

3 Claims. (Cl. 91—31)

My invention relates to a process for continuously manufacturing armored construction boards in which an armoring layer is guided through a container containing a paste which is applied to the armoring layer by means of rollers.

A process of this kind is known according to which the armoring layer is guided from below in an upward direction between pairs of applying rollers which are arranged in the container with the paste, the bearings of the applying rollers being urged together by springs. As the force with which the rollers are urged together is relatively great the surface of the rollers which consists of wire gauze is subjected to heavy wear. Another drawback is that the springs lose their resiliency and the rollers are not urged together in a uniform way so that the armoring layer consisting of gauze is crooked and may easily tear. When the armoring layer begins to get crooked it is impossible to get it straight again so that serious interruption of the work caused by tearing of the gauze cannot be avoided.

The purpose of my present invention is to provide a process for continuously manufacturing armored construction boards in which getting crooked and breakage of the armoring layer is prevented.

This object is attained according to my invention by the armoring layer being guided zigzag on the applying rollers. In this way it is impossible that the layer is pressed only at one side as it is the case with the pairs of rollers applied in the known process.

Further the invention relates to an apparatus for applying the process according to my invention, said apparatus being characterized by a number of applying rollers which are arranged in such a way that the armoring layer may be guided zigzag on said rollers.

The drawing shows by way of example an apparatus according to my invention. In this drawing:

Fig. 1 is a section through an apparatus according to the invention,

Fig. 2 is a partial top-view, a part being illustrated in section, and

Fig. 3 is a section of a detail at a larger scale.

The apparatus according to the invention which is shown in the drawing contains a support 1 which is movable in vertical direction along a guide 2 by means of a rack 3 connected therewith and a pinion 4 engaging said rack. Said pinion may be rotated by a crank and is provided with a ratchet wheel so that the support 1 may be fixed at a desired height. At each side of the apparatus a support of this kind bears one end of a shaft 5 carrying a roll 6 of gauze of which the armoring layer consists. Said layer 7 is guided zigzag on three rollers or shafts 8, 9 and 10 which are arranged outside of the paste container. A number of pivotal arms 11 are arranged above the shaft 8 and are each provided with a brake shoe, a hook 13 for carrying a weight and a hook 14 for bringing the arm out of operation by hanging the same on a rod 15.

A container 16 contains the material which is to be applied to the armoring, e. g. an asbestos-cement paste; a shaft 17, a number of applying rollers 18 and a number of stirring members 19 are arranged in the container 16. Further two pairs of pressing rollers 20 are arranged above the container 16.

The armoring layer which is guided over the shafts or rollers 8, 9 and 10 outside the container 16 is guided in the container on the shaft 17 and thereupon zigzag on the applying rollers 18. The applying rollers 18 are of the known kind with a surface consisting of wire or gauze through which the superfluous liquid of the paste may escape to the interior of the rollers and may flow away through the sleeves 21 which project beyond the container 16. The armoring layer being guided zigzag each side of said layer 7 is alternatively provided with a thin pressed out layer of paste so that when leaving the last applying roller a construction board of the desired thickness is obtained. This board is further guided between the pressing rollers 20 so that a beautiful smooth surface is obtained.

The zigzag guiding of the armoring layer has the result that getting crooked is completely prevented so that interruptions of work are avoided. The apparatus consisting of rollers 8, 9 and 10 and the arms 11 with the brake shoes 12 has the purpose to supply the armoring layer exactly straight into the container in case said layer after leaving the roll 6 would tend to get crooked. This may be prevented by disconnecting some of the arms 11 from the rod 15 and to charge the same by a weight if necessary. If in this way the gauze is guided straight again the arms 11 may be hooked again on the rod 15.

A layer of asbestos cement paste of a thickness of about 1 mm. is applied to the armoring layer 7 by each of the applying rollers, so that by choosing a certain number of applying rollers 18 it is possible to manufacture a building board of the required thickness. The pressure rollers 20 the purpose of which is to press the formed board to a dry state may have a cover of rubber and gauze.

It is evident that the invention is not limited to the manufacturing of asbestos cement boards but that the same may be applied with the same advantages to the manufacturing of building boards other materials being supplied to the armoring layer by means of rollers.

I claim:

1. A process for manufacturing armored construction boards comprising, continuously passing successive portions of an armoring web through a bath of coating paste and alternately subjecting opposite sides of the web to a roughening and compressing action, each of equal force and duration, whereby to cause the paste to adhere in successive layers of equal thickness to opposite sides of the web.

2. An apparatus for the manufacture of armored construction boards in which an armoring layer is coated on either side with a paste comprising, a treating container adapted to hold the paste with which the armoring web is coated, means for passing the armoring web through said container, and a plurality of perforate means within the container for impressing and compressing the paste adherent to the web, said means being arranged to act alternately with equal force on opposite sides of the web, the means operable on one side of the web being coextensive in number with the means operable on the other side, whereby to cause the paste to adhere in successive layers of equal thickness to opposite sides of the web.

3. An apparatus for the manufacture of armored construction boards in which an armoring layer is coated on either side with a paste comprising, a treating container adapted to hold the paste with which the armoring web is coated, means for passing the armoring web through said container, and hollow gauze cylinders within the container for impressing and compressing the paste adherent to the web, said cylinders being alternately operable with equal force on opposite sides of the web, the cylinders operable on one side of the web being coextensive in number with those operable on the other side, whereby to cause the paste to adhere in successive layers of equal thickness to opposite sides of the web.

G. J. ARENTSEN.